April 28, 1959 T. R. BRUNSON 2,883,749
ORTHODONTIC APPLIANCE HOLDER
Filed Sept. 11, 1957

INVENTOR.
THAYER R. BRUNSON
BY
*Philip H. Sheridan*
ATTORNEY

United States Patent Office 2,883,749
Patented Apr. 28, 1959

2,883,749

ORTHODONTIC APPLIANCE HOLDER

Thayer R. Brunson, Denver, Colo., assignor to Rocky Mountain Metal Products Co., Denver, Colo., a corporation of Colorado Application September 11, 1957, Serial No. 683,393

1 Claim. (Cl. 32—66)

This invention relates to an orthodontic appliance holder for supporting and carrying in slidable relation a plurality of orthodontic brackets of the type including a tube forming a socket portion through which an orthodontic arch wire is adapted to extend or be positioned therein.

As is well known to those in the orthodontic field, various types of brackets are employed in supporting and securing the arch wire to a tooth band. Among these orthodontic brackets are lingual and buccal tubes and sheaths, each including a tubular portion forming a socket for receiving a part of the arch wire and flange means for securing the bracket to a tooth band. Typical of such brackets is illustrated in the A. B. Brusse United States Patent No. 2,524,763 and such brackets are generally supplied to the practicing orthodontist in individual or strip form. For example, twelve such brackets may be included on a strip and they may be individually severed from the strip by transverse scores in the strip between the brackets as illustrated in said patent.

The orthodontist employs a welder for securing the bracket to a tooth band and the weld is caused through the flange means of the bracket. If the bracket is an individual element not in strip form, then one hand of the orthodontist must be utilized in holding this minute object in place relative to the tooth band while the welding operation is being conducted and obviously this is a tedious and awkward operation to say nothing of the possible waste of these expensive brackets due to dropping and the improper position thereof when welded. With the brackets in strip form the orthodontist may hold onto the strip while welding one of the brackets included in the strip, but then there occurs the problem of detaching the welded bracket from the strip at the transverse scored means adjacent the welded bracket and here again an awkward and cumbersome operation is involved.

It is the main object of this invention to provide an orthodontic appliance holder wherein a plurality of brackets adapted to be individually welded to a tooth band may be slidably and loosely maintained in position on the holder and wherein it is a simple matter for the orthodontist to properly position one of the brackets to be welded relative to the band and following welding to remove the welded bracket from the holder.

A further object of the invention is to provide a holder-bracket combination of the type described wherein the bracket includes a tube forming a socket portion and the holder includes an elongated body of a size to fit in the socket, thus permitting ready sliding movement of the bracket on the holder, said body including at one end handle means for the orthodontist which prevents the bracket from being removed at the one end and at the other end a distorted portion or area of a size and shape to provide a frictional force for the bracket that must be overcome prior to removal of the bracket from the other end of the body.

Yet another object of the invention is to provide an orthodontic appliance holder for maintaining a plurality of orthodontic brackets of the type described in convenient form and position for the orthodontist and wherein none of the brackets will become misplaced and yet they individually may easily be properly positioned and welded to a tooth band and thereafter removed readily from the holder.

Other objects and advantages of the invention will become apparent by referring to the accompanying drawing wherein like numerals represent similar parts throughout, wherein an example of a preferred embodiment is illustrated, and wherein.

Figure 1:
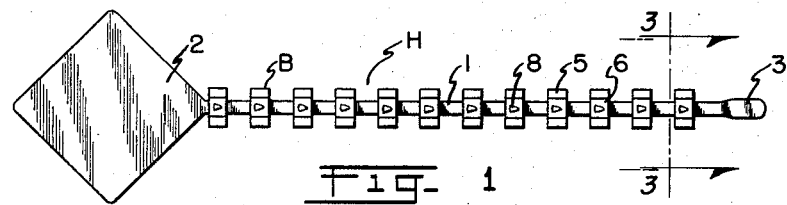
Figure 1 is a top plan view of the combined holder and orthodontic bracket support of this invention.
Figure 2:
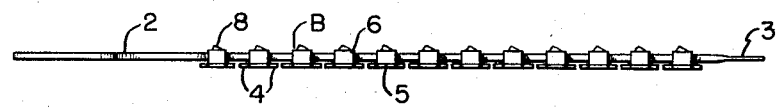
Figure 2 is a side elevational view thereof.
Figure 3:
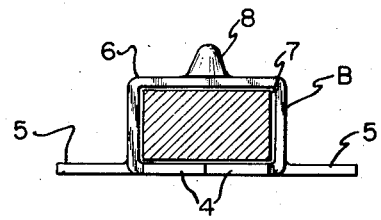
Figure 3 is an enlarged sectional view taken along the lines 3—3 of Figure 1.

The holder of this invention generally represented by H will be more completely described hereinafter, but it includes an elongated body portion 1 having at one end handle means 2 and at the other end a distorted area 3. Various types of brackets may be supported and carried by this holder, such as all types of lingual and buccal tubes and sheaths, although each bracket must have a tubular or socket portion for receiving the elongated body 1.

For purposes of illustration, reference is made to said Brusse patent and the bracket illustrated in the present drawing is substantially identical with the lingual tube of the patent. This bracket generally represented at B is preferably made of stainless steel from a single stock of material and includes end flanges 4 and lateral flanges 5 which are to be secured to a tooth band, a tube portion 6 having an opening or socket 7 and a shoulder 8 on the exterior of the tube portion for the purpose of maintaining an orthodontic arch wire under tension when the free end thereof is positioned thereagainst. Opening 7 is of a size to properly receive a standard orthodontic arch wire and is rectangularly shaped as shown. Body 1 is also rectangular in shape and of a size slightly less than the socket 7 and thus it may be freely passed through opening 7 of each bracket B whereby the brackets will be carried by body 1 but slidable in relation thereto.

Figure 4:
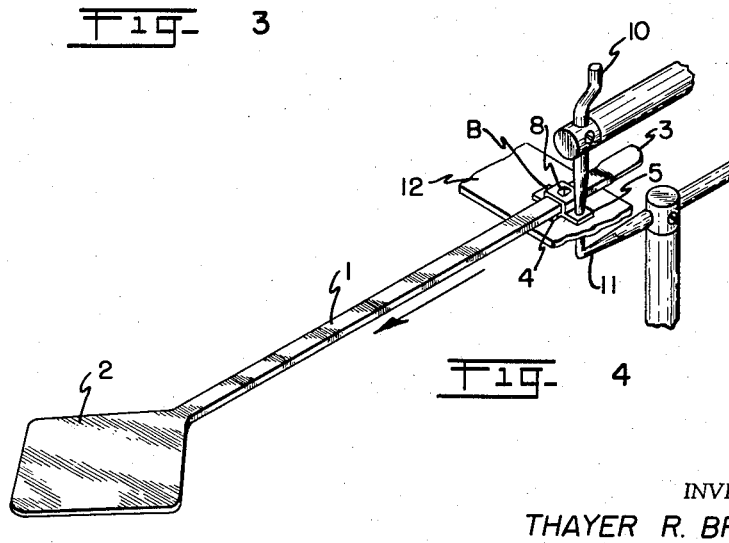
Figure 4 is a perspective diagrammatic view illustrating use of the holder in conjunction with welding a bracket to a tooth band.

Referring to Figure 4, there is shown an upper electrode 10 of any suitable welder and a lower electrode 11. A portion of a tooth band is illustrated at 12 and the purpose of the electrodes is to weld the flanges 4 and 5 to the tooth band whereby a bracket B will be integrally secured at the proper location relative to the tooth band. Assuming that bracket B was an individual element, to carry out the welding of Figure 4 it would be necessary for the orthodontist to hold in one hand the band 12 in relation to the electrodes and to properly position by the use of his other hand the bracket B and due to the minute size of these elements such is a very delicate operation and frequently results in improper positioning of the bracket on the band. Sometimes the brackets B are furnished to the orthodontist in strip form with there being one dozen brackets in a strip, each bracket being divided from the next adjacent by transverse score means in the strip which permits severance of an individual bracket from the remaining strip. In such instance the orthodontist may hold onto the strip or handle means thereof if provided and position the outermost bracket at the proper location on band 12 and then carry out the welding operation. Following this by a pivoting or bending of the strip relative to the welded bracket the latter may be detached from the strip, but this also has been found to be a cumbersome operation although the welded bracket is usually positioned more properly than if the orthodontist does not have the benefit of the strip form.

The present invention provides a means whereby the brackets may be carried in a non-connected manner and yet they may be properly positioned on the band prior to welding and easily removed from the holder following the welding. The handle means 2 may be of any desired shape and as illustrated is square and the distorted portion 3 also may be of varied shaped and, as shown, is a continuation of body 1 that has been flattened to provide a frictional area that must be overcome before a bracket B may be removed therefrom. Preferably, the holder H in its entirety is made of a suitable resilient plastic and the body is of a size to carry in slidable relation a dozen brackets B, the width of area 3 being such that it cannot pass through a socket 7 unless a force overcoming the difference in width between socket 7 and area 3 is applied. Of course, area 3 is made of plastic that has resilient characteristics which "give" as compared with stainless steel.

Assuming there is only one bracket B remaining on body 1 for purposes of illustration and this bracket is to be welded to the band 12, the orthodontist in one hand holds onto the handle means 2 and properly locates and positions the bracket B relative to the band. Next the flanges 4 and 5 are welded to the band 12 and the bracket becomes integral therewith. Thereafter the orthodontist manually pulls the holder in the direction of the arrow of Figure 4 with such force that the frictional effect of distorted portion 3 is overcome and end 3 passes through opening 7, this frictional force being sufficient to prevent the brackets from falling off body 1 but permitting the brackets to be readily removed from body 1 after they are integral to another element such as band 12.

It is to be understood that the orthodontic appliance disclosed is merely an example of the preferred embodiment of the invention and that modifications are possible in the particular structure without departing from the fundamental principles of the invention. Thus, being aware of these possible modifications and uses, I desire it to be understood that the scope of the invention is not to be limited except in accordance with the terms of the appended claim and equivalents thereof.

What is claimed is:

An orthodontic appliance holder for supporting and carrying in slidable relation at least one orthodontic bracket, said bracket comprising a tube forming a socket portion into which an arch wire may be inserted and flange means for securing the bracket to a tooth band, said holder comprising an elongated body of resilient plastic and of a size to pass through the socket portion and permit sliding movement of the bracket on the body, handle means for an operator at one end of the body of a size to prevent removal of the bracket from the body at the one end, a distorted portion at the other end of the body, said distorted portion being of a size and shape to provide a frictional force for the bracket that must be overcome prior to removal of the bracket from the other end, the socket portion and body being substantially rectangular in shape and the distorted portion being made of resilient plastic, and the distorted portion being a flattened rectangular shaped continuation of the elongated body, the handle means, elongated body and distorted portion being essentially in the same plane.

References Cited in the file of this patent

UNITED STATES PATENTS

| | | |
|---|---|---|
| 1,519,738 | McGowan | Dec. 16, 1924 |
| 1,652,625 | Hilborn | Dec. 13, 1927 |